United States Patent
Orr

(10) Patent No.: US 10,616,152 B2
(45) Date of Patent: Apr. 7, 2020

(54) AVOIDING MESSAGE CONFLICT

(71) Applicant: Novastone Media Ltd., London (GB)

(72) Inventor: Douglas Orr, Windsor (GB)

(73) Assignee: Novastone Media Ltd., London (GB)

( * ) Notice: Subject to any disclaimer, the term of this patent is extended or adjusted under 35 U.S.C. 154(b) by 0 days.

(21) Appl. No.: 16/252,297

(22) Filed: Jan. 18, 2019

(65) Prior Publication Data

US 2019/0245814 A1 Aug. 8, 2019

Related U.S. Application Data

(63) Continuation of application No. 14/937,380, filed on Nov. 10, 2015, now Pat. No. 10,187,333.

(30) Foreign Application Priority Data

Nov. 19, 2014 (GB) .................................. 1420586.8

(51) Int. Cl.
*G06F 15/16* (2006.01)
*H04L 12/58* (2006.01)
(Continued)

(52) U.S. Cl.
CPC .............. *H04L 51/04* (2013.01); *H04L 67/04* (2013.01); *H04L 67/125* (2013.01); *H04L 67/306* (2013.01); *H04L 67/42* (2013.01)

(58) Field of Classification Search
CPC ....... H04L 51/04; H04L 67/04; H04L 67/125; H04L 7/306; H04L 67/42
(Continued)

(56) References Cited

U.S. PATENT DOCUMENTS 8,874,677 B2 * 10/2014 Rosen ................... H04L 51/36
709/206
8,965,964 B1 2/2015 Odell et al.
(Continued)

OTHER PUBLICATIONS

UK Search Report; Application No. GB1420586.8; dated May 19, 2016; 5 pages.

*Primary Examiner* — Frantz B Jean
(74) *Attorney, Agent, or Firm* — Fish & Richardson P.C.

(57) ABSTRACT

A communication system for communicating instant messages between a plurality of user accounts, each instant message forming part of a logical conversation stream comprising one or more such messages, the system comprising: a plurality of communication terminals, each communication terminal being configured to service a respective user account by simultaneously supporting multiple instant messaging clients, each client being (i) associated with a respective user interface different from that of the other instant messaging clients supported on the terminal, (ii) capable of transmitting and receiving instant messages to and from user accounts serviced on others of the communication terminals and (iii) configured to attribute to each instant message generated through that client an identifier corresponding to the client; a database storing a user profile for each of the user accounts, each user profile indicating which clients are supported by the communication terminal for the respective user account; and a server entity for supporting communication of the instant messages, the server having access to the database and being configured to direct instant messages received from one of the communication terminals to a specific instant messaging client on another communication terminal servicing an account of an intended recipient, the specific client being selected by the server entity in dependence on the identifier attributed to the (Continued)

message received from the said one of the terminals and the user profile of the account of the intended recipient.

10 Claims, 6 Drawing Sheets

(51) Int. Cl.
    *H04L 29/08*     (2006.01)
    *H04L 29/06*     (2006.01)

(58) Field of Classification Search
    USPC .......................................................... 709/206
    See application file for complete search history.

(56) References Cited

U.S. PATENT DOCUMENTS

| | | |
|---|---|---|
| 2002/0007398 A1 | 1/2002 | Mendiola et al. |
| 2003/0028597 A1 | 2/2003 | Salmi et al. |
| 2008/0162642 A1 | 7/2008 | Bachiri et al. |
| 2012/0198012 A1* | 8/2012 | Odell ................... G06Q 10/107 709/206 |
| 2013/0218877 A1* | 8/2013 | Satyanarayanan ... G06Q 30/016 707/723 |
| 2014/0337745 A1 | 11/2014 | Odell et al. |
| 2015/0326651 A1* | 11/2015 | Ormseth ................. H04L 67/22 709/204 |

\* cited by examiner

| User Account | Devices | Supported IM Clients | ID |
|---|---|---|---|
| User B | Smartphone | Bank Chat | ABC123 |
| | | Shopping Chat | EFG456 |
| | Tablet | Bank Chat | ABC123 |
| | | Shopping Chat | EFG456 |
| User C | Smartphone | Bank Chat | ABC123 |
| | | Shopping Chat | EFG456 |
| | | Holiday Chat | XYZ789 |
| | Laptop | Bank Chat | ABC123 |
| | | Shopping Chat | EFG456 |
| | | Holiday Chat | XYZ789 |

Fig. 3

AVOIDING MESSAGE CONFLICT

CROSS-REFERENCED TO RELATED APPLICATIONS

This application is a continuation of U.S. application Ser. No. 14/937,380, filed on Nov. 10, 2015, which claims priority to UK Patent Application No. 1420586.8 titled "Avoiding Message Conflict" which was filed on Nov. 19, 2014. The disclosure of the foregoing application is incorporated herein by reference in its entirety.

SUMMARY

The present disclosure is related to avoiding message conflict when communicating messages between communication terminals configured to support multiple instances of an instant messaging engine.

BACKGROUND

Instant messaging (IM) is a form of communication that has grown in popularity in recent times. IM is conventionally supported by a client application running on a user device, for example a smartphone or a computer terminal. The client application presents a user interface from which a user can generate messages for transmission to other users, and view messages received from other users. When a message is to be transmitted the client application can cause the user device to transmit that message to one or more remote servers operated by the organisation that provides the IM platform in question. Those servers then direct the message to the client application of the intended recipient. IM messages are typically transmitted over internet protocols.

Typically, a user communicates via IM by first logging into an IM account by means of the IM client application. Once logged in, the user can see which of his/her contacts are also logged in. This information is derived from the servers of the IM provider. The user can communicate with one more of those users. Some IM clients allow the user also to transmit messages to contacts not currently logged into their account, who can then view the messages once they are logged in.

One particular feature of IM messages is that they pass via a dedicated backend operated by the organisation that provides the IM platform in question. A single organisation may provide multiple distinct IM clients that can be used on a single user device. Although the IM clients may be distinct in the sense that a user uses each client individually, that they present themselves as distinct applications on the user's terminal and that they have different user interfaces which may present different branding, the clients may nevertheless operate according to the same underlying technical framework, or engine. They could each comprise or use identical software for handling their messaging functions. They could also share the same backend servers. This may provide certain advantages for the organisation such as reducing cost by minimising the amount of software engineering and backend architecture required. A user of one such IM client may also benefit from being able to send messages to a greater number of contacts by having access to individuals who use any of the IM clients supported by the shared backend instead of being limited to just the contacts who use the same IM client as the user.

However, implementing multiple distinct types of IM clients using a shared or common backend may have the drawback that the distinct types of IM clients begin to conflate. For example, if a user device is running more than one type of IM client, IM messages received at the user device might be received by each type of the client running on that device. Alternatively, a message communicated by one user device using one type of client could potentially be received by the recipient user device on another type of client. This could happen for example if the two user devices do not both use a common client.

As well as being frustrating for the user, this conflation of the IM clients may be undesirable for privacy or confidentiality reasons. If an IM client is dedicated to a particular purpose, for example communicating financial information, a user would likely wish to ensure that any communicated message was only received by the same type of client at the recipient devices, and to not be received by user devices that are not running that type of client at all.

There is therefore a need for an improved way of communicating with users with electronic devices supporting multiple IM clients.

SUMMARY OF INVENTION

According to one aspect of the present invention there is provided a communication system for communicating instant messages between a plurality of user accounts, each instant message forming part of a logical conversation stream comprising one or more such messages, the system comprising: a plurality of communication terminals, each communication terminal being configured to service a respective user account by simultaneously supporting multiple instant messaging clients, each client being (i) associated with a respective user interface different from that of the other instant messaging clients supported on the terminal, (ii) capable of transmitting and receiving instant messages to and from user accounts serviced on others of the communication terminals and (iii) configured to attribute to each instant message generated through that client an identifier corresponding to the client; a database storing a user profile for each of the user accounts, each user profile indicating which clients are supported by the communication terminal for the respective user account; and a server entity for supporting communication of the instant messages, the server having access to the database and being configured to direct instant messages received from one of the communication terminals to a specific instant messaging client on another communication terminal servicing an account of an intended recipient, the specific client being selected by the server entity in dependence on the identifier attributed to the message received from the said one of the terminals and the user profile of the account of the intended recipient.

The server entity may be configured to determine if the user profile of the account of the intended recipient contains an indication that the communication terminal for that account supports the same client as the client to which the identifier attributed to the received message corresponds, and if so, to direct the instant message to that instant messaging client on the terminal servicing the account of the intended recipient.

The server entity may be configured to determine if the user profile of the account of the intended recipient contains an indication that the communication terminal for that account supports the same client as the client to which the identifier attributed to the received message corresponds, and if not, to direct the instant message to a client on that terminal that is pre-designated as a default client.

The server entity may be configured to determine if the user profile of the account of the intended recipient contains a designation indication of a default client, and if so, to direct the instant message to that client in response to determining that that user profile does not contain an indication that the communication terminal for that account supports the same client as the client to which the identifier attributed to the received message corresponds.

The server entity may be configured to direct the instant message to the client on the terminal servicing the account of the intended recipient from which the server has most recently received an instant message in response to determining that the user profile of the account of the intended recipient does contains neither: (i) an indication that the communication terminal for that account supports the same client as the client to which the identifier attributed to the received message corresponds; nor (ii) a designation of a default client.

The server entity may be configured to determine if the user profile of the account of the intended recipient contains an indication that the communication terminal for that account supports the same client as the client to which the identifier attributed to the received message corresponds, and if not, to direct the instant message to the client on the terminal servicing the account of the intended recipient from which the server has most recently received an instant message.

The server entity may be configured to maintain information defining a list of instant messaging clients, the server entity being configured to determine if the client to which the identifier attributed to the received message corresponds is a client on that list, and if so, to only direct the instant message to a client on the terminal servicing the account of the intended recipient if the user profile of that account contains an indication that the terminal for that account supports the same client as the said client to which the identifier attributed to the received message corresponds.

The server entity may be configured to determine if the user profile of the account of the intended recipient contains an indication that the communication terminal for that account supports the same client as the client to which the identifier attributed to the received message corresponds, and if not, to then determine whether the client to which the identifier attributed to the received message corresponds is a client on the list.

The server entity may be configured to not direct the instant message to a client on the terminal servicing the account of the intended recipient in response to determining that: (i) the user profile of the account of the intended recipient does not contain an indication that the communication terminal for that account supports the same client as the client to which the identifier attributed to the received message corresponds; and (ii) the client to which the identifier attributed to the received message corresponds is a client on the list.

The server entity may be configured to direct a further message to the communication terminal from which it received the instant message in response to determining that the client to which the identifier attributed to the received message corresponds is a client on the list.

Each of the instant messaging clients on a communication terminal may be provided by a respective application stored in non-transient form in memory on the terminal.

Each of the instant messaging clients on a communication terminal may be provided by common application stored in non-transient form in memory on the terminal which provides each client by means of a respective user interface.

According to a second aspect of the present invention there is provided a communication system for communicating instant messages between a plurality of user accounts, each instant message forming part of a logical conversation stream comprising one or more such messages, the system comprising: a plurality of communication terminals, each communication terminal being configured to service a respective user account by simultaneously supporting multiple instant messaging clients, each client being (i) associated with a respective user interface different from that of the other instant messaging clients supported on the terminal, (ii) capable of transmitting and receiving instant messages to and from user accounts serviced on others of the communication terminals and (iii) configured to attribute to each instant message generated through that client an identifier corresponding to the client; a database storing a user profile for each of the user accounts, each user profile indicating clients are supported by the communication terminal for the respective user account; and a server entity for supporting communication of the instant messages, the server having access to the database and being configured to direct an instant message to a specific instant messaging client on each of the plurality of terminals as part of a push notification, the specific client for each terminal being selected by the server entity in dependence on the identifier attributed to the message that triggered the push notification and the user profile of the account of the intended recipient.

According to a third aspect of the present invention there is provided a communication terminal configured to service a user account by transmitting and receiving instant messages to and from a plurality of user accounts on remote devices, each message forming part of a logical conversation stream; wherein the communication terminal is configured to simultaneously support multiple instant messaging clients, each client being associated with a respective user interface different from that of the other instant messaging clients supported on the terminal and configured to: transmit and receive instant messages to and from user accounts serviced on others of the communication terminals; attribute to each instant message generated through that client an identifier corresponding to the client; and filter instant messages received from another communication terminal using the identifier corresponding to said client so as to display received instant messages having attributed thereto an identifier matching the identifier corresponding to said client and to not display received messages with an attributed identifier that does not match the identifier corresponding to said client but that matches an identifier corresponding to one of the other clients supported on the terminal.

Each client may be configured to display received messages with an attributed identifier that does not match the identifier corresponding to said client if said client is pre-designated as a default client.

The communication terminal may be configured so that only one client of the multiple supported client is pre-designated as a default client.

Each client may be configured to determine the identifiers corresponding to the other clients supported on the terminal using A URL scheme.

The communication terminal may be configured to communicate an indication of the clients supported on the terminal for that account to a server.

Each of the instant messaging clients may be provided by a respective application stored in non-transient form in memory on the terminal.

Each of the instant messaging clients supported on the terminal may be provided by a common application stored in non-transient form in memory on the terminal which provides each client by means of a respective user interface.

The communication terminal may be one of: a smartphone, a tablet, a personal computer, a laptop, an audio player, an e-reader.

BRIEF DESCRIPTION OF THE DRAWINGS

Embodiments of the present invention will now be described by way of example with reference to the accompanying drawings. In the drawings:

FIG. 3 shows an example of a user profile stored at a database for a user of the communication system.

DETAILED DESCRIPTION

Figure 1:
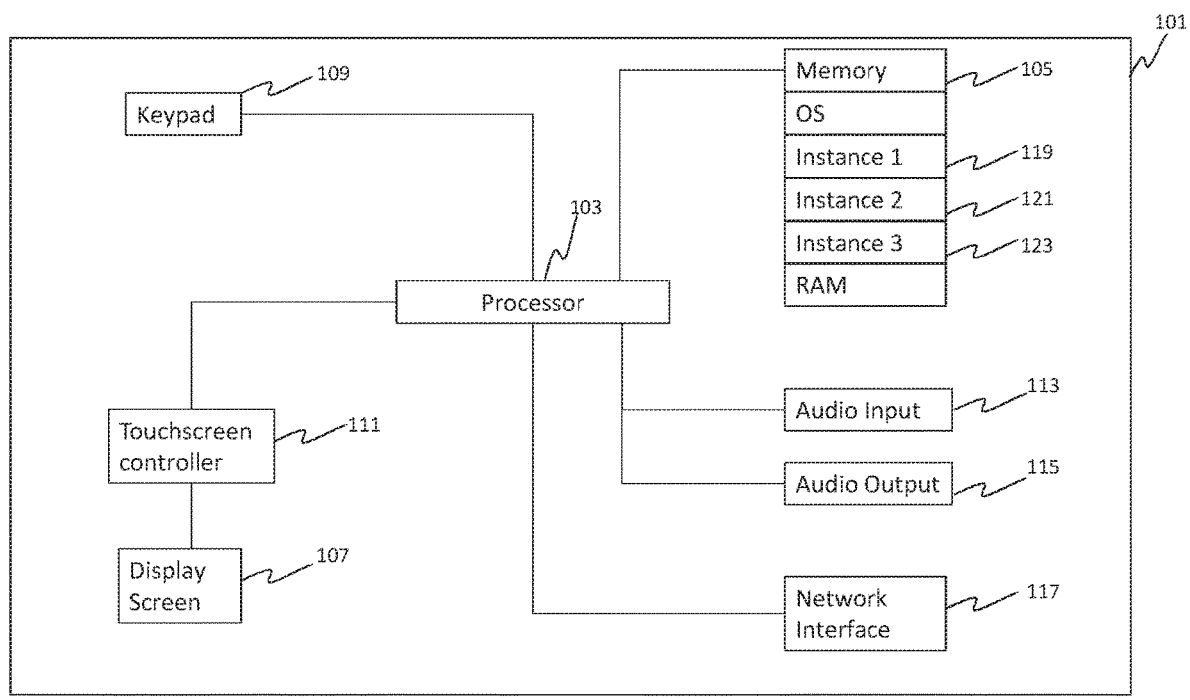
FIG. 1 shows an example of a communication terminal

In the system described below, users of communication terminals communicate with each other by exchanging instant messages. In order to communicate a message using a communication terminal, the communication terminal runs one or more IM clients. Each IM client implements an instant messaging or "chat" function, permitting users of compatible IM clients to chat via the exchange of instant messages with each other.

The instant messaging clients are configured to be capable of exchanging the messages in a substantially instantaneous manner, provided the communication clients have adequate network connectivity. The communication clients are arranged to communicate via at least one server function that is dedicated to supporting the intercommunication of the communication clients. The server function can be provided by the same entity (e.g. the same business or provider) that provides the instant messaging clients to the users. Because instant messages can pass through dedicated servers operated by the organisation providing the platform, that organisation can control the user's access to the backend architecture. Users communicating via instant messaging can therefore communicate using a single platform.

The single platform nature of instant messaging can make the transmission and reception of messages appear more fluid, or real-time, as compared to other communication platforms such as email. This can be achieved by appropriate design of the user interface of the instant messaging client, which can be enforced by the requirement for authentication between each client and the server side of the system. Email typically has a cross-server architecture whereby each email client communicates messages via its own server or backend. The communication of a message between different email clients requires that the clients' servers intercommunicate. This can lead to a latency associated with the transmission and reception of messages. The latency can be indeterminate and may vary with time, for example in dependence on the network conditions. Consequently, a conversation conducted by email can often appear asynchronous to the users. A conversation conducted via instant messaging may not suffer from the same limitations and as a result can appear more synchronous and natural to the user.

The cross-server architecture of email may also lead to a less secure communication environment than that of instant messaging, where all messages pass through dedicated servers. For example, it is not uncommon for users of email to suffer from increasing levels of spam, or junk messages. This reduced level of security might make it less appealing for a user to use email to communicate information of a sensitive, or confidential, nature. The dedicated backend architecture of instant messaging platforms means that the communication of messages might be made more secure.

A single entity (e.g. a business or provider) may provide multiple distinct types of IM clients for use on communication terminals. The different types of IM client may be provided for communicating instant messages pertaining to a particular subject or of a particular nature. For instance, one type of IM client may be provided to support communications relating to shopping, whereas another type of IM client may be directed to supporting chats relating to banking, or investments. The IM clients may be 'private label' clients in the sense that they are directed to supporting chat about products or services offered by a single business or company.

A particular communication terminal may support a number of these distinct types of IM clients simultaneously. For example a terminal may have installed on it a client for banking chat and a client for shopping chat. Each type of IM client may use the same underlying instant messaging engine. Each IM client may use the same single underlying engine. Alternatively each type of IM client on the terminal may use a respective instant messaging engine, each of the same type. Each IM client may be configured to communicate messages via the same backend architecture, e.g. via the same server entity. Each type of IM client may cause a communication terminal to transmit and receive messages in the same way, for example using the same communications protocols and authentication channels. Alternatively, or in addition, each of the IM clients may be configured to group messages for presentation to a user in the same way. Each of the IM clients may also provide the same underlying communication functionality to a user.

As an example, consider the situation in which a provider provides three types of IM client, each of which uses the same underlying IM engine: a banking chat client, a shopping chat client and a holiday chat client. A communication terminal with the banking chat client and the holiday chat client running is simultaneously supporting two instant messaging clients; a terminal with all three clients running simultaneously supports three instant messaging client instances.

Each type of IM client is associated with a user interface that is distinct from the user interfaces of the other types of IM client. Instances of each IM client supported on a terminal may therefore be differentiated by the user interface presented to the user when that particular instance is opened, or run, on the communication terminal. That is, each client is associated with a respective user interface different from that of the other IM clients supported on the terminal.

The user interface for each type of client may be tailored in dependence on the intended function for that client. As an example, continuing with the types of client introduced above, the banking chat client may provide an interface to enable a user to access account information and to communicate that information in the form of an instant message, whereas the shopping chat client may enable a user to access a catalogue of clothes or accessories for communication to a contact.

Each user has an identity under which he or she is portrayed in the communication environment supported by the IM clients. That identity may be linked to a user account by means of which the user has authenticated himself to each client supported on the communication terminal. A user may have a single user account by which the user can authenticate himself to each type of IM client the user has installed on their device. This may be a particularly convenient solution when each type of IM client is provided by a single business/entity, in which case the user account could be held with that provider.

A user may have access to several devices on which the various types of IM client are installed. Each of the user's devices may simultaneously support multiple IM clients. The user may then authenticate to each type of client for each device using the same account. In this way, the user can receive messages transmitted to his account using any of the devices supporting one of the IM clients.

Although using the same IM engine to provide multiple different types of IM client is convenient and efficient from the side of the provider, it may cause problems which adversely affect the users' experiences. One problem that may arise is that messages broadcast from the server entity, for example push notifications, may be delivered to each IM client supported on a terminal. In certain circumstances this may mean that the push notification is delivered to clients that were not intended to receive the notification. Another problem that may arise is that content generated by one IM client and intended to remain within that client may appear in each IM client supported on the terminal. For example, a stream of messages forming a confidential conversation between a user and his or her banking adviser and tied to a particular type of IM client (e.g. the banking chat client) may appear on each IM client supported on the user's terminals (e.g. the shopping chat client and the holiday chat client).

These problems can arise from the fact that each type of IM client uses the same backend and server entities. Aside from the detriment to the users' experience of using the clients, this could lead to more serious consequences such as the duplication of information (which may be sensitive or confidential) into an IM client that is an inappropriate forum for such information.

Described herein are approaches which may overcome the aforementioned problems. These approaches may be particularly suitable for use in communication systems that support the communication of instant messages between a plurality of user accounts. Each instant message may form part of a logical conversation stream comprising one or more of such messages. Such a communication system comprises a plurality of communication terminals that are each configured to service a respective user account by simultaneously supporting multiple IM clients. Each IM client supported on a terminal is (i) associated with a respective user interface different from that of the other IM clients supported on the terminal and (ii) capable of transmitting and receiving instant messages to and from user accounts serviced on others of the communication terminals within the system.

The communication system may support a number of different types of IM client provided by a business/entity/provider. The types of IM client refer to the IM product, or service, offered by the provider and capable of being installed on communication terminals, and may be embodied by the nature of the user interface provided by the respective client. Referring to the earlier examples, types of IM client include a bank chat client, a shopping chat client, a holiday chat client etc. Each of these different types of IM client utilises the same underlying IM engine but is associated with a unique user interface. The underlying IM engine could be a platform that provides a software framework used by each type of IM client. Each type of client could be a different skin of this underlying platform, or framework.

A communication terminal having multiple different types of IM client installed simultaneously supports multiple IM clients. An 'instance' refers to the unique client being run/operated/executed on a particular terminal. Thus for two terminals each with the same type of client installed there will be two instances of the IM client. Similarly, a terminal running two copies of an IM client is supporting two instances of that client.

The transmission and reception of IM messages between user accounts may allow users of those respective accounts to exchange messages as part of a chat, or conversation. Messages communicated in this fashion form part of a logical conversation stream of messages in the sense that the server supporting the system and/or the communication terminals themselves maintain a record of when each message was generated so as to enable the stream of messages to be displayed in the correct order. A logical conversation stream is the record of messages exchanged as part of a communication thread and could contain messages exchanged over multiple chat 'sessions' if each of those sessions were conducted under the same thread. A logical conversation stream of messages may therefore contain messages spanning a timeframe of several days, weeks, or even months.

The messages may contain items of additional content other than text. For example, the messages may contain PDFs, MP3 files, audio files, images, video files etc. The additional items of content may be embedded within the IM.

A message may also identify a file or a group of files that are stored on a remote data server accessible to a messaging terminal over a network. On receiving such a message a terminal may enable its user to command the terminal to download the file or files from the remote location. The message may, for example, include a uniform resource locator (URL) identifying the location at which the file or files are accessible over the internet. Multiple such files may take the form of a collection, which can be displayed. Messages may also be in the form of collections displayed by the terminal in a tiled arrangement. In this way a user may create a collection of digital artefacts which can easily be shared with the user's contacts. The artefacts could be, for example, PDFs, MP3 files, audio files, video files, images etc. A collection may contain a number of artefacts of the same type. Alternatively a collection may contain differing types of digital artefact. The user can select the images for a particular collection from a variety of sources, for example from a library of images stored on the user's device, from the internet or from a catalogue. The catalogue may accessed via the internet. The catalogue may be dedicated to illustrating items for sale provided by a particular business, or company. Each type of IM client may be associated with a respective catalogue dedicated to a particular business or company. The collection can be transmitted to a remote user account in a similar manner to the chat messages described above. Collections may also be displayed as part of a conversation so that a collection can form part of the message stream.

In one embodiment, each communication terminal is configured to attribute to each instant message generated through a particular IM client an identifier corresponding to that client. The identifier may for example correspond to the user interface associated with that client. The identifier can be used to ensure that IM messages generated through a particular client remain within that client and do not appear in IM clients supported on the device.

In one approach each of IM clients supported on the communication terminal uses its identifier to filter received instant messages so as to only display instant messages with an attributed identifier that matches the identifier of that same client, and to not display instant messages with an attributed identifier that does not match the identifier of that client but that matches an identifier corresponding to another of the clients supported on the terminal.

In this approach instances of each IM client on a terminal receives a copy of the IM message from the server that is communicated to the user account serviced by that terminal. The instances then filter out the messages with an identifier that does not match their own.

For example, if the message is in the form of a collection, each collection is associated with an identifier corresponding to the IM client through which the collection was generated. Each IM client would then receive a copy of the collection and would use its corresponding identifier to filter the received collections so as to only display collections with an attributed identifier that matches the identifier of that same client.

In an alternative approach, the backend of the system operates so as to only communicate the IM messages to a specific IM client on a communication terminal, rather than to communicate a copy of the message to each client. In this approach the system comprises a database storing a user profile for each user account, each user profile indicating which clients are supported by the communication terminal for the respective user account. The server entity of the system has access to the database and is configured to direct instant messages received from one of the communication terminals to a specific IM client on another terminal. The server entity selects the specific client in dependence on the identifier attributed to the received message and the user profile of the account of the intended recipient.

In the following description and in the drawings, like reference numerals denote like components.

FIG. 1 is a schematic illustration of the components of a communication terminal 101. The terminal may be an electronic device such as, for example, a mobile phone, a smartphone, a tablet, a laptop, personal computer (PC), augmented reality device (for example video-equipped glasses), a games console, an audio (e.g. MP3) player or an e-reader. It may be an electronic device that embodies the functionality of a number of the aforementioned devices.

The terminal comprises a processor 103, a memory 105, a display screen 107 and a keypad 109. The keypad 109 is an input mechanism that enables the user to enter alphanumeric symbols to compose messages, and may also provide a navigation button to enable the user to navigate the graphical user interface displayed on the screen 107.

The display screen may be a touchscreen, in which case it can function as an input device such that a user of the device can navigate through various menus displayed on the screen by touching the screen, either with his/her finger or with a stylus. In the event the screen is a touchscreen, the device 101 comprises a touchscreen controller 111 configured to interpret touches on the screen and to process that information to effect an action. If the screen is a touchscreen there may be no need for the keypad 109 as the device may permit the user to enter text by means of the touchscreen.

The terminal also comprises an audio input 113 such as a microphone, and an audio output 115 such as a speaker. The microphone can be used to receive an audio input from a user of the terminal and the speaker can be used to output an audio signal received at the user terminal, such as during a telephone conversation.

The memory 105 may include volatile memory such as RAM, as well as non-volatile memory, such as ROM. The terminal includes an operating system (OS) which is stored in the memory and which is executed by the processor 103. Multiple instant messaging clients (119, 121 and 123) are stored in memory to enable the terminal to service a user account belonging to a user of the terminal. Each client is run on the operating system when executed by the processor. Each client may be in the form of a mobile application, or app. It may be pre-installed on the terminal at manufacture or it may be downloaded and installed on the terminal by a user after manufacture, e.g. from an on-line store. Each client can be run or executed on the terminal to enable the transmission and reception of instant messages to and from user accounts serviced on other terminals.

The communication terminal may be configured so that each of the supported IM clients is provided by a respective application. Alternatively, the terminal may be configured so that each of the instant messaging clients is provided by a common application which provides each client by means of a respective user interface. Each application could be implemented as a native application or a web application. The interface associated with a client could be provided in a web browser communicating to a server that provides elements of the user interface to the terminal.

Although in this figure each IM client is shown provided in software, it is to be understood that this is for the purposes of illustration only and a client may alternatively be in the form of dedicated hardware.

The device also comprises a network interface 117 to facilitate the transmission of data to, and reception of data from, a communication network. The network interface could be a wired or wireless communication transceiver. The data for transmission may be generated by the IM client instances running on the OS, or by other applications running under the control of the OS. That data can be passed to the network interface, under the control of the OS, for transmission over the wireless network. Likewise, data received at the network interface 117 over the wireless communication network can be passed to an instance of IM client or to another application under the control of the OS.

Figure 2:
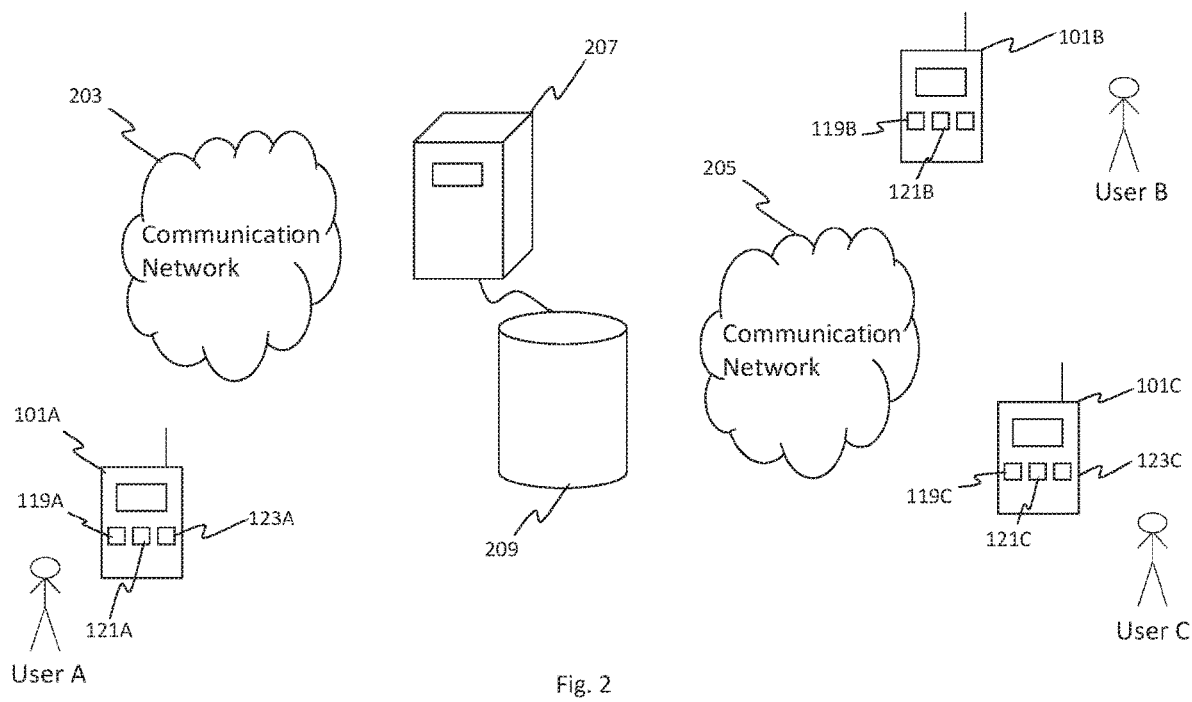
FIG. 2 shows an example of a communication system for supporting communication of instant messages.
Figure 4A:
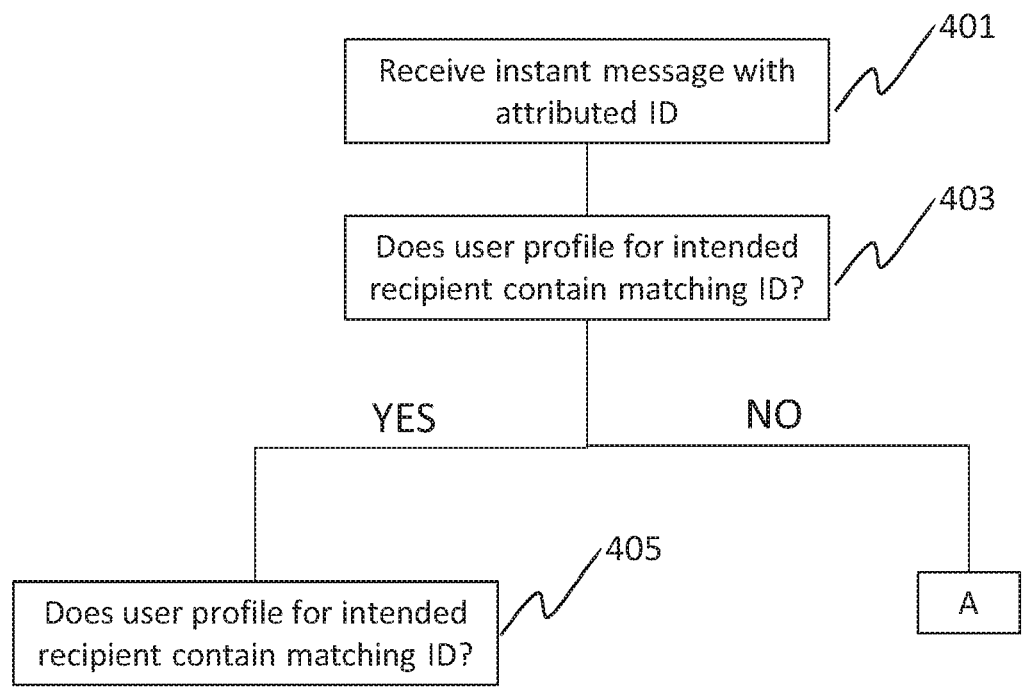
FIGS. 4A, 4B, 4C, and 4D show a series of flowcharts for causing an instant message to be directed to a specific instance of a messaging engine on a terminal servicing an account of an intended recipient.
Figure 4B:
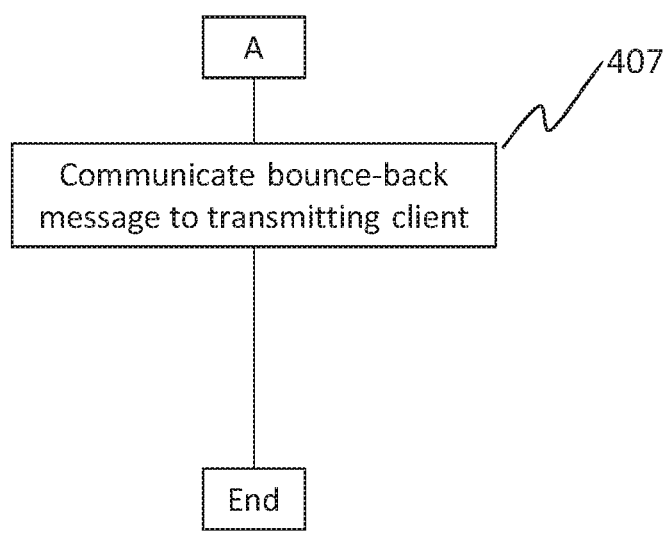
Figure 4C:
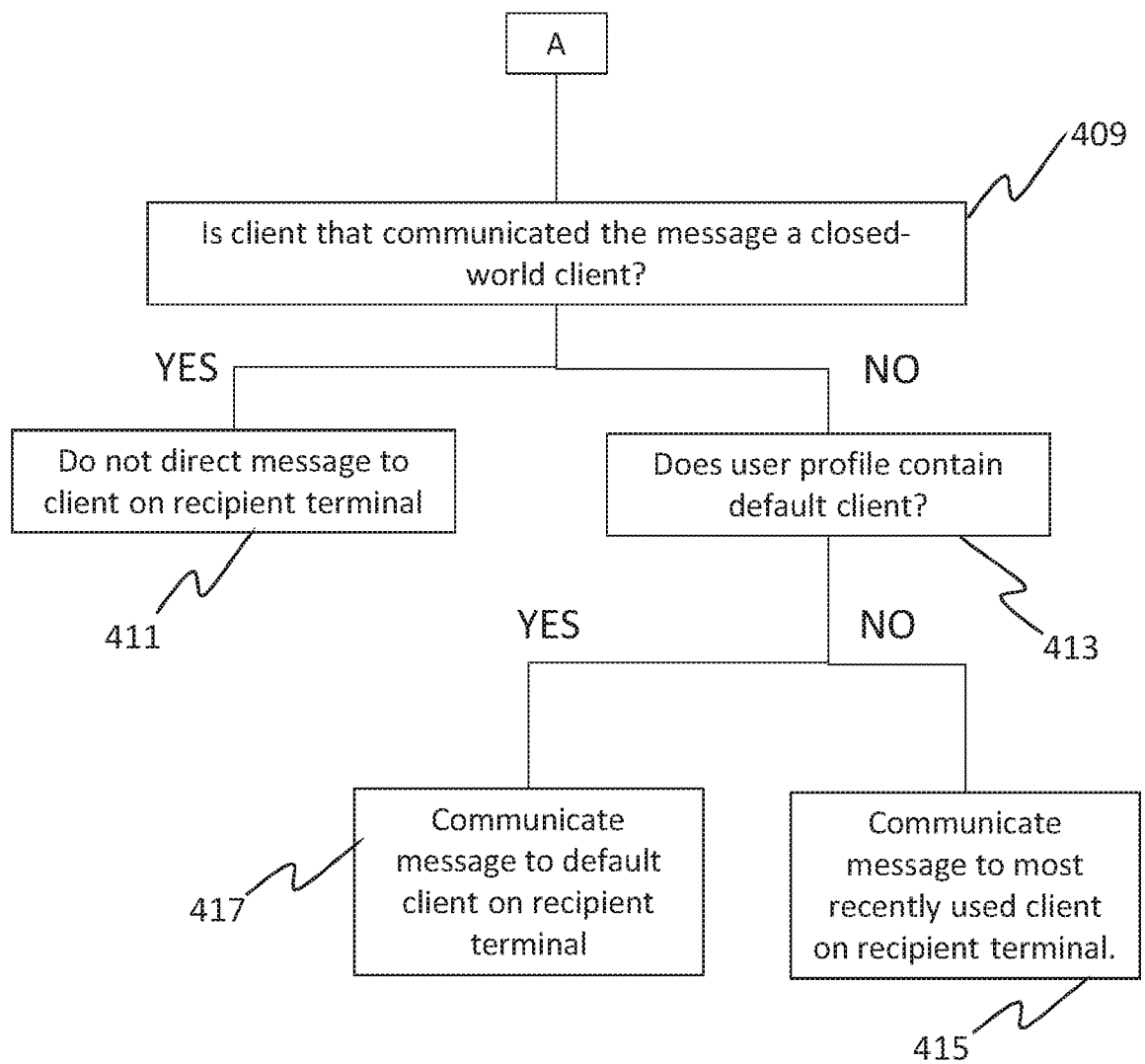
Figure 4D:
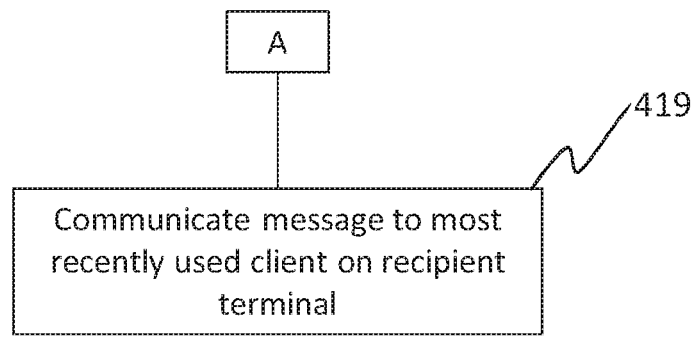

FIG. 2 shows a schematic illustration of a communication system 201 for communicating instant messages between a plurality of user accounts. Shown in the diagram are users A, B and C with communication terminals $101_A$, $101_B$ and $101_C$ respectively. Further shown are communication networks 203 and 205, and a server 207 configured to access a database 209.

Each terminal services a respective user account by simultaneously supporting multiple IM clients to enable users A, B and C to communicate instant messages. For the purposes of illustration, terminal $101_A$ supports three IM client instances, denoted $119_A$, $121_A$ and $123_B$, terminal $101_B$ supports instances $119_B$ and $121_B$, and terminal $101_C$ supports instances $119_C$, $121_C$ and $123_C$. The reference numeral of the instance (i.e. 119, 121 and 123) is used to illustrate the type of IM client. The lettered suffix is used to illustrate the particular instance supported on a communication terminal. For example instances $119_A$, $119_B$ and $119_C$ are the same type of IM client (e.g. the bank chat client) but are separate instances running on three separate devices. Thus in this example the terminals support multiple IM clients by running one instance for each type of client. Each type of client is associated with a respective user interface different from that of the other types of client supported on the terminal.

Instant messages are communicated between user accounts over communication networks 203 and 205. Each network may be any kind of communication network and may be made up of wired and/or wireless elements. It may include a wireless cellular network such as a 3G or LTE network, a publicly accessible data network such as the internet and/or short-range wireless access networks such as IEEE 802.11 and/or Bluetooth networks.

Instant messages communicated between user accounts pass through the server 207. The IM clients and the server are configured to exchange messages that can include a body field, a sender field, a recipient field, a subject field and an identifier field. The body field can include any one or more of text, images, sound, video and other content. The sender field identifies a user account from which the message was sent. The recipient field identifies one or more recipient user accounts to which the message is directed. The subject field can be used to indicate a subject of the message. The identifier field contains an identifier (ID) corresponding to the client used to generate the message. The ID may correspond to the user interface associated with the client, and so identify the type of IM client used to generate the message because each type of client is associated with a respective user interface.

When a user creates a new message using an IM client, he can input content for the body field of that message, one or more recipients for the message and optionally content for the subject field of the message. The instance forms a message having the entered attributes. If the message is created as a reply to an existing message then the instance gives the message the same ID as the existing message. The ID could be constrained to be unique by the operator of the system. It could contain a pseudo-random element.

The server is configured to use the ID of a received instant message to direct the message to a specific IM client on the communication terminal servicing the recipient user account. The message can then be displayed at the terminal when an instance of that client is run, or open (along with other messages forming part of the same logical conversation stream). In this way messages do not appear on each type of IM client on the recipient's terminal.

As an illustration and with reference to FIG. 4, consider the scenario in which user A composes an instant message on their device $101_A$ using the instance $119_A$. Suppose the message is intended for communication to user B's user account. Upon composing the message, instance $119_A$ populates the identifier field with the ID corresponding to that instance (i.e. corresponding to client 119). The composed message is then transmitted over communication network 203 to the server 207 (step 401).

The server is configured to access a database 209. The database stores a user profile for each user account supported by the system 201. Each user profile contains information that indicates which IM clients are supported by the communication terminal for the respective user account. The server accesses the database in order to determine a specific client on the recipient terminal to direct the instant message to. The term 'database' refers to the function performed by entity 209 rather than its physical manifestation. For example, database 209 may refer to a logical database defining the logical structure and relationship between different pieces of information. The logical database may be stored across one or more pieces of hardware, for example on one or more servers. Alternatively the database 209 may refer to the storage of data in an unstructured form. The unstructured data may be stored on one or more physical pieces of hardware, such as one or more servers.

The communication system may include a database management system (DBMS) for querying the database and analysing results obtained from the database. The database management system may form part of server 207 or database 209. Alternatively the DBMS may be executed on dedicated hardware.

An example of how the user profiles may be stored on the database is shown in FIG. 3. Here user profiles 301 and 303 are shown for users A and B only for the purposes of illustration. Column 305 contains a list of the user accounts for each user of the system. The terminals servicing each user account are shown in column 307, with the corresponding IM clients installed on the terminal shown in column 309. Finally, column 311 contains the ID corresponding to each client. As shown, separate instances may have the same ID if those instances are different instances of the same type of IM client.

In alternative embodiments, the database may simply store the name of the type of IM client, or an indication of the user interface of that client, in the ID field.

Referring back to the example, upon receiving an instant message from terminal $101_A$, the server accesses the database to determine the specific client to direct the message to. Using the recipient field of the received message, the server can determine that the intended recipient user account (belonging to User B in this case) is serviced by a smartphone. The server can further use the user profile to determine the terminal servicing user B's account supports two IM clients in the form of the bank chat client and the shopping chat client. The server then uses the ID contained in the identifier field of the received message to determine which client to direct the message to.

The server may make this determination in a number of ways. For example, the server may as a first step determine whether the user profile for the intended recipient contains an ID that matches the ID attributed to the received message (step 403). If so, the server directs the message to the IM client on the recipient's terminal that has a matching corresponding ID (step 405). This ensures that the only instances that receive the IM message are instances of the same IM client that communicated the message, i.e. the message is contained within the same IM client.

In some cases the server may determine from the user profile that the recipient user account does not contain a matching ID. This would correspond to the situation where a user sends a message from an IM client that is not supported on the terminals servicing the recipient user account. When this happens the server may respond in a number of ways.

One option would be for the server to communicate a 'bounce-back' message to the transmitting client (instance $119_A$ in this case) to inform the user that the message couldn't be delivered (step 407). For example, if instance $119_A$ was the banking chat client, the bounce-back message could state: "User B does not have the banking chat client installed".

In certain circumstances, rather than transmitting a bounce-back message it may be preferable for the server to direct the message to a client on a terminal even if the profile for the recipient account does not contain an indication that the communication terminal for the recipient user account supports the same client as the client to which the ID attributed to the received message corresponds. That is, rather than not transmit the message to the recipient at all, the server directs the message to a different client than that of the transmitting client. Whether or not this is more preferable to returning a bounce-back message may depend on the type of IM client that communicated the message.

For example, for IM clients that are designed for communicating confidential or personal information, such as a banking chat client, it may be more preferable to not communicate the message to the recipient user account at all if that account is not serviced by the same client. These types of IM client may be referred to as 'closed-world' clients because messages are constrained so as to be wholly contained within the client: there is no interoperability with other clients using the same underlying IM engine.

For other types of IM client that are designed for communicating information of a more frivolous nature, it may be more preferable that the message is directed to a different client servicing the recipient account rather than not being delivered at all. These types of IM client may be referred to as 'open-world' clients because they are interoperable with other clients using the same underlying engine.

The server may contain information defining a list of instant messaging clients. The list of clients could be a list of the closed-world clients. It may be a list of the open-world clients. Alternatively it may be a list of closed-world and open-world clients.

Upon determining that the recipient user account does not contain a matching ID for the received message, the server may be configured to next determine whether the instance that communicated the message is an open-world or closed-world client (step 409). The server may do this by determining if the client to which the identifier of the received message corresponds is a client on the list. For example, if the server contains a list of closed-world clients and the server determines that the identifier attributed to the received message corresponds to a client on the list, the server determines that the transmitting client was a closed-world client. If the client that communicated the message is a closed-world client, the server generates a bounce-back message (step 411). If it is an open-world client, the server directs the message to an instance of a different type of client servicing the recipient user account. Of course, if the system does not contain closed-world clients, this step is not required. The server may be configured to direct the message to one type of client as a default should the user profile indicate (via the list of identifiers corresponding to the user interfaces associated with the supported instances) that that client is supported on the recipient terminal (step 417). Which client is chosen as the default can be configurable at the server by the operator of the system.

As an example, consider that instances 119$_{A,B,C}$ are instances of a closed world client and that instances 121$_{A,B}$ are instances of the default client. If user A composes a message for user B using instance 123$_A$, the server would determine that there is no matching IM client on device 101$_B$, and so would direct the message to instance 121$_B$.

The server may be configured to maintain a hierarchical list of default clients. Should the IDs in the user profile of the recipient account not correspond to those of the default client, the server could direct the message to the the next default client in the hierarchical list, and so on.

Alternatively, the server may simply direct the message to the most recently used client supported by the communication terminal for the recipient's user account. This may be in response to determining that the user profile for the intended recipient does not contain a default client (steps 413 and 415) or directly in response to determining that the user profile for the recipient user account does not have a matching ID for the received message (step 419).

Similar steps may also be performed by the server in relation to push notifications. When a push notification is generated, a copy of the message is transmitted to each terminal supporting at least one of the clients provided by the provider. The server is configured to communicate a message to a specific client on each of the terminals. In an analogous manner to that described above, the server can determine the specific client for each terminal in dependence on the identifier attributed to the received message and on the user profile of the account of the intended recipient. In this case, the identifier of the received message will be the identifier attributed to the message that triggered the push notification.

The server may determine the client on each terminal to receive the push notification by following a priority order. For example, the server may as a first priority direct the message to the same client as the client that triggered the notification. If the server determines that a terminal does not support the same client as the client that triggered the notification, the server may direct the message to a pre-designated default client. The type of IM client pre-designated as the default client may be selected by the operator of the system. It could for example be the most popular client, or most widely used. If the server determines that the terminal also does not support default client, it may then communicate the notification to the most recently used client supported on the terminal.

By operating in this way, the server can advantageously avoid sending a push notification to each client supported on each terminal.

The examples described above are equally applicable to messages in the form of collections. In this case, the server could receive a collection from a client on a communication device. The server can use the identifier attributed to the collection to determine a specific client to direct the collection to. Alternatively, the message communicated to the specific client may inform that client that a new collection has been created by a particular user account. That client can then communicate a message to the server to retrieve the collection from the server. The server, in response to receiving the message from the client, can communicate the collection to the client.

In an alternative embodiment, each IM client supported on the communication terminal uses the ID in the identifier field of the received message to filter out messages with an identifier that corresponds to a different client. If the ID indicates that the client that communicated the message was a different type of IM client, but matches an ID of a different client supported on the terminal, the receiving client does not display that message.

In this embodiment the server directs a copy of the message to each IM client on the terminals servicing the recipient user account. It is then up to the receiving clients to filter out the messages so that a given client only displays messages communicated from the same type of client. Although this embodiment has the disadvantage of transmitting multiple copies of a message to a recipient user account compared to the previous embodiment, it may have the advantage of being simpler to implement because it does not require any advanced functionality at the server.

If an instance of the IM engine filters out a received message, the instance may cause that copy of the message to be deleted from the terminal's memory. This may have the advantage of freeing up the terminal's memory by minimising the amount of redundant messages stored.

Figure 5:
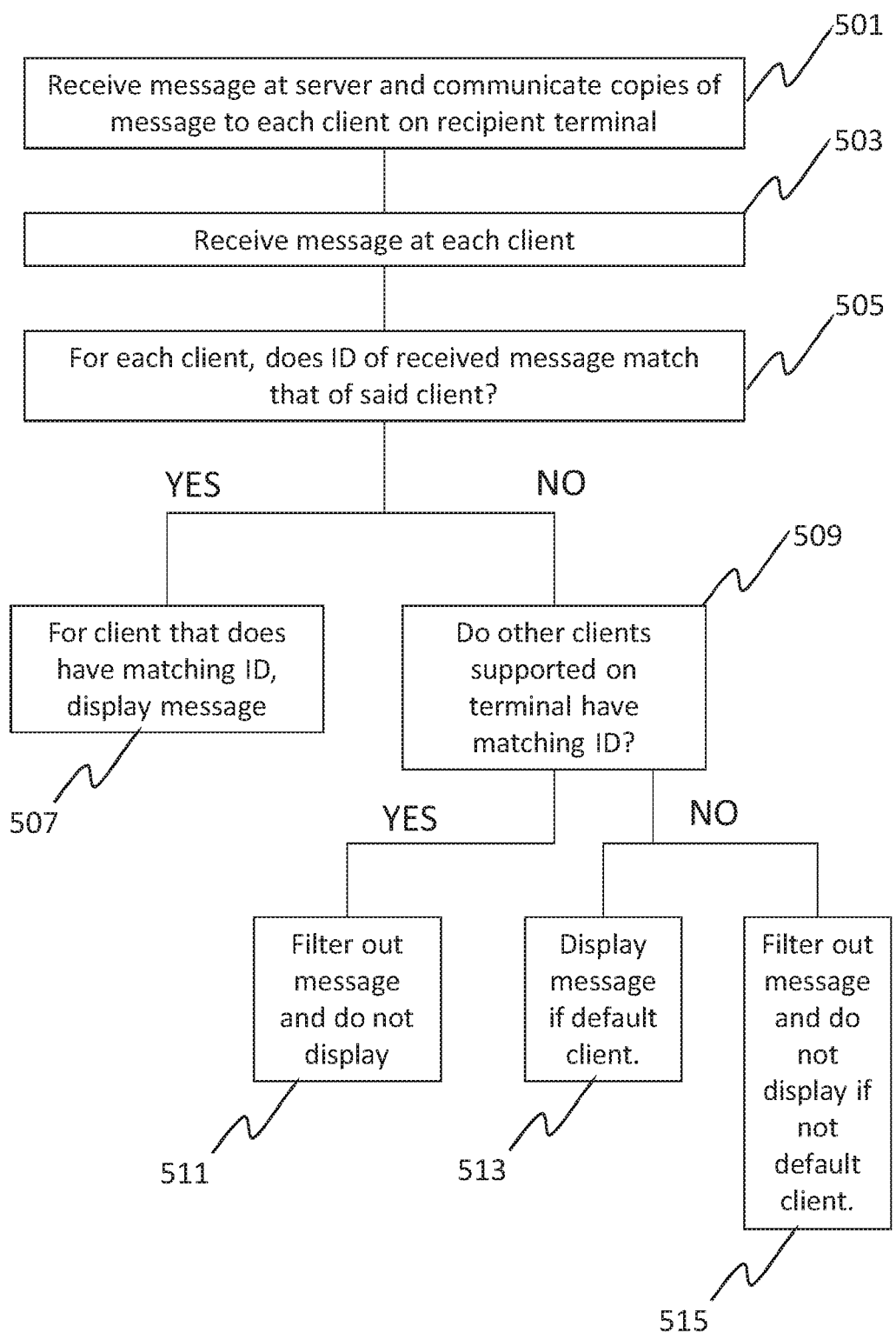
FIG. 5 shows a flowchart for causing a message received at a terminal to be displayed by a single instance of a messaging engine supported on that terminal.

An exemplary series of steps performed by an IM client operating according to this embodiment will now be described with reference to FIGS. 2 and 5. Consider the situation in which user A composes a message using instance $121_A$ intended to be communicated to user B's user account. Upon composing the message, instance $121_A$ populates the identifier field with an ID corresponding to the user interface associated with client 121. The message is received at the server 207 which communicates copies of the message to instances $119_B$ and $121_B$ on terminal $101_B$ servicing user B's account (step 501).

Each instance will then receive a copy of the message and determine whether the identifier attributed to the received message matches the identifier corresponding to the client for that same instance (steps 503 and 505).

For example, instance $119_B$ is associated with a different user interface to instance $121_A$ (i.e. they are different IM clients). Instance $119_B$ will therefore have a different associated identifier to instance $121_A$, meaning that the identifier contained in the message received from the server will not match the identifier locally held by that instance. Instance $119_B$ will thus filter out the received message and not display it when that instance is run on the terminal.

In contrast instance $121_B$ is associated with the same user interface as instance $121_A$ (i.e. they are different instances of the same IM client). The identifier corresponding to the user interface of instance $121_B$ will therefore match the identifier in the received message, and thus instance $121_B$ will display the received message (along with the other messages forming part of the same logical conversation stream) (step 507).

It can be envisaged that in certain scenarios a message will be communicated from client that is not supported on the terminal servicing the recipient's user account. This would correspond to the situation where a message is composed on an IM client that is not installed on the recipient device. This would occur for example if a message were transmitted from instance $123_A$ to user B's account. In this case the clients on terminal $101_B$ may display the 'foreign' message. This may be dependent on the transmitting instance being an instance of an open-world client, as discussed above. The instances may be configured to not display the received message if they determine from its attributed ID that it was communicated from a closed-world client. The instances may be configured so that only instances of one client display the 'foreign' message. The client chosen to display the foreign message may be a pre-designated default client. The default client may be determined by the operator of the system.

In order for a client to know whether to filter out a message with a mismatched ID or to nevertheless display the message, it is necessary for the client to know the IDs of the other clients supported by the terminal. In that way, when a client receives a message it can first determine whether the ID of the message matches the ID corresponding to that client. If it does, the client displays the message. If it does not, the client may determine whether the ID matches that corresponding to another of the clients supported on the terminal (step 509) If it does, the client will not display the message because it knows another of the supported clients will do so (step 511). If the client determines that the ID of the message does not match those of the other supported clients either, the client will nevertheless display the message if it is a default client (step 513). If it is not the default client, the client will filter out the message and cause it to not be displayed (515).

Each instance may be configured to determine what other clients are supported on the terminal using a URL scheme. A URL scheme enables an application installed on a device (to perform a specific action upon being opened by a user. A system developer could program the clients (using for example a URL scheme API) to determine what other clients are installed on the device upon being opened by a user.

The user device may be equipped with a notification centre to inform the user of the device of alerts from applications. For example if an instance of an application receives an instant message the notification centre may alert the user. The notification centre may do this by displaying a message on the screen of the device, by emitting an audible signal, by causing the device to vibrate, etc. The notification centre may be configured to use the ID of a received instant message in an analogous way to the IM clients in order to filter notifications. In this way the notification centre can alert the user that a message has been received for a particular client supported on the terminal, instead of the notification centre alerting the user that a message has been received by each client supported on the terminal.

For example, the notification centre can use the identifier of the received message to identify a client supported on the terminal with a corresponding user interface that is associated with that same identifier. The notification centre can then alert the user that a message has been received for that identified client. If the notification centre determines that there are no clients supported on the terminal with a corresponding user interface with an associated identifier that matches the identifier of the received message, the notification centre may operate in a similar manner to the IM clients as discussed above. For example, the notification centre may alert the user that a message has been received on another IM client. This IM client may be a default client. This may be dependent on the transmitting client being an instance of an open-world client, as discussed above. The notification centre may be configured to not alert the user of the received message if it determines from its ID that it was communicated from a closed-world client.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication terminal configured to service a user account by transmitting and receiving instant messages to and from a plurality of user accounts on remote devices, each message forming part of a logical conversation stream;
   wherein the communication terminal is configured to simultaneously support multiple instant messaging clients, each client being associated with a respective user interface different from that of other instant messaging clients supported on the communication terminal and configured to:
   transmit and receive instant messages to and from user accounts serviced on other instances of the communication terminal;
   attribute, to each instant message generated through that client, an identifier corresponding to the client; and
   filter instant messages received from another communication terminal using the identifier corresponding to said client so as to display received instant messages having attributed thereto an identifier matching the identifier corresponding to said client and to not display received messages with an attributed identifier that does not match the identifier corresponding to said client but that matches an identifier corresponding to one of other clients supported on the communication terminal.

2. A communication terminal as claimed in claim 1, wherein each client is configured to display received messages with an attributed identifier that does not match the identifier corresponding to said client if said client is pre-designated as a default client.

3. A communication terminal as claimed in claim 2, wherein the communication terminal is configured so that only one client of the multiple supported clients is pre-designated as a default client.

4. A communication terminal as claimed in claim 1, wherein each client is configured to determine identifiers corresponding to the other clients supported on the communication terminal using a URL scheme.

5. A communication terminal as claimed in claim 1, wherein the communication terminal is configured to communicate an indication of the clients supported on the communication terminal for that account to a server.

6. A communication terminal as claimed in claim 1, wherein each of the instant messaging clients is provided by a respective application stored in non-transient form in memory on the communication terminal.

7. A communication terminal as claimed in claim 1, wherein each of the instant messaging clients supported on the communication terminal is provided by a common application stored in non-transient form in memory on the communication terminal which provides each client by means of a respective user interface.

8. A communication terminal as claimed in claim 1, wherein the communication terminal is one of: a smartphone, a tablet, a personal computer, a laptop, an audio player, an e-reader.

9. A computer-readable non-transitory medium having stored thereon code for an instant messaging client that, when executed at a communication terminal simultaneously supporting multiple instant messaging clients, each client being associated with a respective user interface different from that of other instant messaging clients supported on the communication terminal, the communication terminal being configured to service a user account by transmitting and receiving instant messages to and from a plurality of user accounts on remote devices, each message forming part of a logical conversation stream, causes the communication terminal to:
  transmit and receive instant messages to and from user accounts serviced on others of the communication terminals;
  attribute, to each instant message generated through that client, an identifier corresponding to the client; and
  filter instant messages received from another communication terminal using the identifier corresponding to said client so as to display received instant messages having attributed thereto an identifier matching the identifier corresponding to said client and to not display received messages with an attributed identifier that does not match the identifier corresponding to said client but that matches an identifier corresponding to one of other clients supported on the communication terminal.

10. A method of servicing a user account at a communication terminal configured to simultaneously support multiple instant messaging clients, each client being associated with a respective user interface different from that of other instant messaging clients supported on the communication terminal, the method comprising:
  transmitting and receiving instant messages to and from user accounts serviced on other instances of the communication terminal;
  attributing, to each instant message generated through that client, an identifier corresponding to the client; and
  filtering instant messages received from another communication terminal using the identifier corresponding to said client to display received instant messages having attributed thereto an identifier matching the identifier corresponding to said client and to not display received messages with an attributed identifier that does not match the identifier corresponding to said client but that matches an identifier corresponding to one of other clients supported on the communication terminal.

* * * * *

UNITED STATES PATENT AND TRADEMARK OFFICE
CERTIFICATE OF CORRECTION

PATENT NO. : 10,616,152 B2
APPLICATION NO. : 16/252297
DATED : April 7, 2020
INVENTOR(S) : Douglas Orr Page 1 of 1

It is certified that error appears in the above-identified patent and that said Letters Patent is hereby corrected as shown below:

In the Specification

Column 1, Line 3, delete "CROSS-REFERENCED" and insert -- CROSS-REFERENCES --

Signed and Sealed this
Twenty-sixth Day of May, 2020

Andrei Iancu
*Director of the United States Patent and Trademark Office*